UNITED STATES PATENT OFFICE.

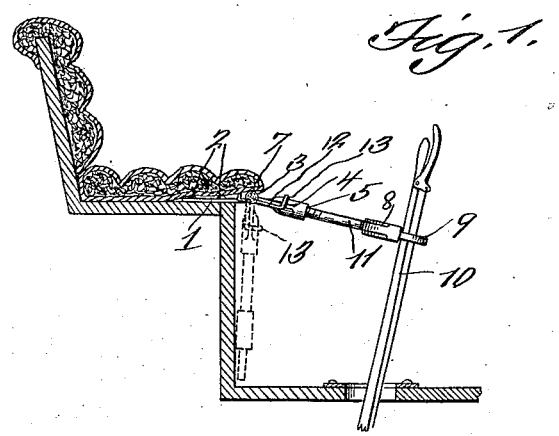

STANLEY G. MILLER, OF CHATHAM, ONTARIO, CANADA.

AUTOMOBILE LOCK.

1,423,955.     Specification of Letters Patent.     Patented July 25, 1922.

Application filed May 28, 1921. Serial No. 473,289.

*To all whom it may concern:*

Be it known that I, STANLEY G. MILLER, a subject of the King of Great Britain, residing at Chatham, in the Province of Ontario and Dominion of Canada, have invented certain new and useful Improvements in Automobile Locks, of which the following is a specification, reference being had to the accompanying drawings.

It is the purpose of the present invention to provide a lock attached to the driver's seat under the cushion or to the front portion of the seat, including means for connection with the hand or emergency brake lever, thereby preventing the brake lever from being released, or may be attached or connected to the clutch lever, and on center control cars the lock may be used for holding the emergency brake on. Also on some makes of cars the lock may be attached with the gear shift lever.

It is obvious that the shackle of the lock proper could be constructed large enough to engage or connect with two levers, for example the emergency brake and the gear shift levers.

Another purpose embodies the provision of a lock that could be conveniently operated, enabling the chauffeur or driver to lock the car before leaving the seat, and unlocking it after resuming position behind the steering wheel.

Still another purpose is the provision of a lock embodying means for automatically placing the lock flat against the front portion of the seat.

A further purpose is to provide a lock, which is secure and does not interfere in the slightest with the usual mechanism of the car or with the electrical wiring, and is adjustable to a certain degree to take up the difference caused by the brake bands.

A still further purpose embodies a device of this character, which is capable of being manufactured for a relatively low cost and sold at a reasonable profit.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a sectional view through the forward seat of an automobile, showing the improved lock as spanning the space between the seat and the member to be locked in full lines, and moved adjacent the front vertical portion of the seat in dotted lines.

Figure 2 is an enlarged perspective view of the lock detached.

Figure 3 is an edge view of the locking device showing the socketed member and the plate 1, the former being in section, and illustrating the manner of mounting the spring upon the ends of the hinge pin.

Referring to the drawings, 1 designates a plate, which may be connected to the upper portion of the seat of an automobile by means of rivets or bolts 2, preferably the former, and hingedly united at 3 to the plate 1 is a cylindrical body 4, which is provided with a threaded slot 5. The ends of the hinge pin 6 are provided with heads 7 which are caused to be formed by means of a swaging action, thereby preventing the member 4 from being disconnected from the plate.

A suitable padlock 8 is provided having a shackle 9, which is designed to engage a member to be locked, designated by the character 10, whether it be the hand or emergency brake, clutch, or the gear shift levers. As previously stated it is obvious that the shackle 9 may be large enough to embrace two levers, thereby preventing them from being moved, as long as the plate 1 is attached to the seat. The body of the padlock is connected in any suitable manner to a shank 11, preferably formed as a part thereof. The shank 11 which may be any suitable length in order to span the space between the seat and either one of the controlling levers of the automobile, and is also adjustable owing to its threaded connections in the slot 5, so as to compensate for the difference caused by the wear on the brake bands.

Connected to the hinge pin in any suitable manner is a heavy spring 12, the spring arms of which bear upon the plate 1, while the spring loop 13 engages the socketed member 4 and holds the shank and its padlock against the vertical portion of the seat of the automobile, particularly when the lock is not in use. When the lock is in such a position, it does not in any way interfere with the complete control of the operating parts of the automobile, and furthermore the driver or chauffeur may dispose the lock in an operative position connected to either one of the control levers before leaving the car. The device may be unlocked after the driver again resumes position on the seat behind the steering wheel.

The invention having been set forth, what is claimed is:

In a lock for automobiles, the combination with a support, of a padlock provided with a shank and a shackle, the latter adapted to embrace a controlling member of the automobile to be locked, a hinge operatively connecting the shank and the support, whereby the shank may assume a substantially perpendicular position adjacent the face of the support, a spring member substantially U-form having its transverse portions engaged with the shank and the extremities of its arms engaged with said support, the arms of the spring member having at their substantially intermediate portions spring coils operatively connected to the hinge pins of the hinge for holding the shank in a substantially perpendicular position adjacent the stationary part of the automobile, when the shackle of the padlock is disengaged from said controlling member.

In testimony whereof I hereunto affix my signature.

STANLEY G. MILLER.